Figures 1, 2:
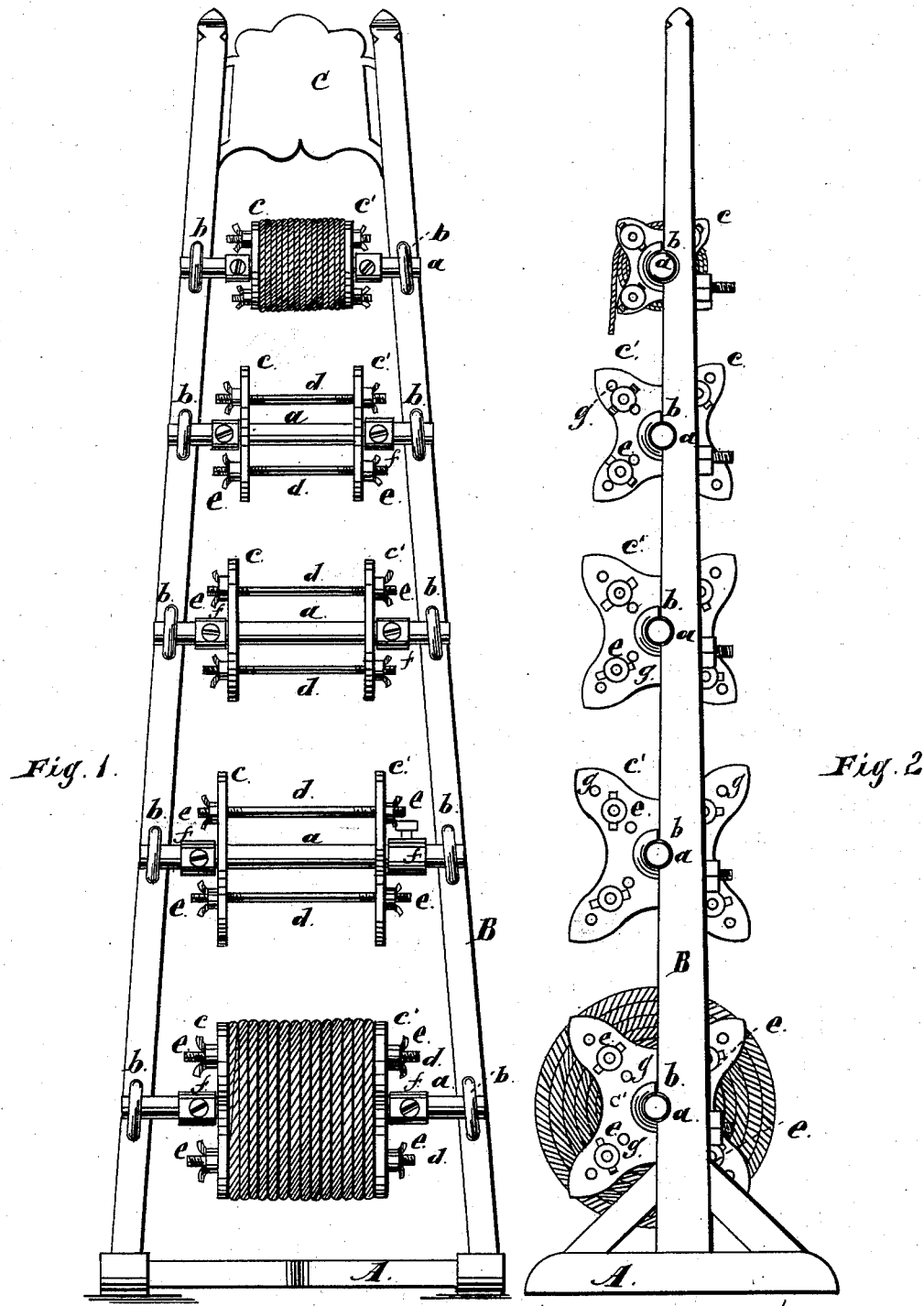

W. SCHARNWEBER.
Rack for Holding Rope Coils.

No. 216,221. Patented June 3, 1879.

Witnesses: Inventor:
William Scharnweber

UNITED STATES PATENT OFFICE.

WILLIAM SCHARNWEBER, OF JEFFERSON, ILLINOIS.

IMPROVEMENT IN RACKS FOR HOLDING ROPE-COILS.

Specification forming part of Letters Patent No. 216,221, dated June 3, 1879; application filed December 18, 1878.

*To all whom it may concern:*

Be it known that I, WILLIAM SCHARNWEBER, of Jefferson, Cook county, State of Illinois, have invented new and useful Improvements in Racks for Holding Rope-Coils, of which the following is a full description, reference being had to the accompanying drawings, in which—

Figure 1 is a side elevation, and Fig. 2 an end elevation.

The object of this invention is to provide a device upon which coils or ropes can be mounted, so as to be easily reeled off or unwound, to arrange such coils so as to occupy less space in sales-rooms, and to so arrange the coil of ropes upon or around the shaft that it will be practically centered and balanced; and its nature consists in providing an adjustable or expansible center shaft or frame to fit the central opening through the coil, and in the several combinations hereinafter more fully described and claimed.

In the drawings, A indicates the base; B, the posts; C, the top plate or connection; $a$, the spool-shafts; $b$, their supports; $c$, end plates of the spools; $d$, rods connecting the end plates; $e$, nuts for adjusting the space between the end plates and pressing them against the ends of the coils; $f$, adjustable collars on shafts $a$, for aiding the holding of the end plates against the coils of rope; and $g$, holes in the end plates for adjusting the rods $d$ to the size of the hole through the coil.

The frame A B is made of wood, and of sufficient width to take in rope-coils as they are ordinarily wound, and of a height to receive three or more coils, five being shown. The top is connected by the plate $e$, or in any suitable manner. The shafts $a$ are supported in the screw-hooks or supports $b$, which pass through the posts, so as to be loosened at the back, for the purpose of taking out the shafts for new coils, or tightened for holding them in place. On the shaft $a$, which does not necessarily revolve, is placed the end plates $c\ c'$, which fit so as to revolve around the shaft. These end plates may be made in complete circles or disks; but I prefer to make them of the star form shown. They are provided with series of holes $g$, so as to make the rods $d$ adjustable in reference to the coil, or so as to permit the placing of the rods farther from or nearer to the center, by which means the rods $d$, which form the middle of the spool, can be made to fit the holes through the coils and keep them central, and prevent them from slipping or from hanging down, as they will when the hole is large, so that they are uncoiled with difficulty.

By means of the screw-nuts $e$ the end plates are held as tightly as desired against the ends of the coil, and the spool is held in place upon the shaft by the collars $f$.

The hook-bolts $b$ can be tightened, so as to prevent any end movement of the shaft $a$.

What I claim as new, and desire to secure by Letters Patent, is—

1. The combination of the end plates $c\ c'$ and shaft $a$ with the rods $d$ and nuts $e\ e$, for adjusting the length of the spool and giving a pressure to the ends of the rope-coil, substantially as described.

2. The combination of the plates $c$, rods $d$, nuts $e$, and one or more collars, $f$, with the shaft $a$ and supports $b$, substantially as set forth.

WILLIAM SCHARNWEBER.

Witnesses:
O. W. BOND,
H. F. BRUNS.